United States Patent Office 2,956,859
Patented Oct. 18, 1960

2,956,859

PREPARATION OF ANHYDRITE

Warren Rodgers, St. Louis, and Charles R. Trampier, Webster Groves, Mo., assignors to National Lead Company, New York, N.Y., a corporation of New Jersey No Drawing. Filed Dec. 26, 1957, Ser. No. 705,130

4 Claims. (Cl. 23—122)

This invention relates in general to a method for the preparation of anhydrite. More specifically it relates to a method for preparing pigmentary grade anhydrite from gypsum.

Several methods have been developed heretofore for preparing anhydrite of pigmentary grade, some of which teach dehydrating gypsum by a high temperature drying treatment to form anhydrite. However, the anhydrite formed in this manner is usually too coarse in size to be particularly useful for pigment purposes without further processing. Other previously known methods for the preparation of pigmentary grade anhydrite comprise reacting lime or limestone or other alkaline reacting compounds with concentrated sulfuric acid using in some instances, a large excess of concentrated sulfuric acid to form the anhydrite product directly from the lime or limestone; or, in other instances, reacting the lime or limestone with concentrated sulfuric acid to form a hydrous calcium sulfate compound which is converted to anhydrite by heating. Thus, in all such processes in which lime, limestone, or other alkaline reacting materials are used, it is necessary to use large amounts of virgin concentrated sulfuric acid with or without expensive heat treatments as a consequence of which such processes are uneconomical. However, it has now been discovered that a pigmentary grade anhydrite may be prepared by a process using a non-alkaline reacting compound, such as gypsum. The gypsum used may be prepared from lime or limestone without using virgin concentrated $H_2SO_4$.

An object of the instant invention is to provide a process for the production of pigmentary grade anhydrite from a non-alkaline reacting compound, such as gypsum. Another object of the instant invention therefore is to provide a process for the economical production of high quality calcium sulfate anhydrite from gypsum which is prepared from lime or limestone. A further object of the instant invention is to provide a process for the preparation of pigmentary grade anhydrite from lime or limestone without treating the lime or limestone with virgin concentrated sulfuric acid. A still further object is to provide a method for preparing finely divided anhydrite wherein lime or limestone is reacted with waste sulfuric acid to form a non-alkaline reacting calcium compound, i.e., gypsum which is converted to anhydrite by $H_2SO_4$ in a manner characterized by a preliminary seeding step. These and other objects will become apparent from the following more complete description of the instant invention.

Broadly, this invention contemplates a method for preparing finely divided pigmentary anhydrite which comprises reacting waste sulfuric acid with an aqueous lime or limestone slurry to form gypsum, preparing a predetermined amount of an aqueous slurry of from 20% to 50% solids of said gypsum, forming an anhydrite seed by recrystallizing a minor portion of said gypsum slurry with strong sulfuric acid and then adding the remaining portion of said gypsum slurry to said anhydrite seed and heating the mixture to convert all of the gypsum to anhydrite.

More specifically, the preparation of a pigmentary grade anhydrite by the method of this invention comprises first preparing a predetermined amount of an aqueous slurry of a non-alkaline reacting calcium compound, i.e., an aqueous slurry of gypsum of from 20% to 50% solids by reacting lime or limestone with waste sulfuric acid, the lime or limestone being of high purity, i.e., having less than 0.1% and preferably less than 0.01% color degrading impurities. A minor portion of the gypsum slurry, i.e., from 5% to less than 50% of the total predetermined amount of slurry, is added with rapid agitation to $H_2SO_4$ of an acid concentration of from 74% to 80% and at a temperature below 70° C. and preferably below 50° C. to form an anhydrite seed. The remaining or major portion of the gypsum slurry is then added to the anhydrite seed and the mixture agitated while heating, preferably with steam, to a temperature from 80° C. to boiling until all of the gypsum is converted to anhydrite.

With respect to the gypsum slurry, the latter may be made from naturally occurring gypsum but for economical reasons it has been found preferably to prepare the gypsum slurry by reacting lime or limestone with waste sulfuric acid. If the gypsum slurry is prepared in this manner, the following conditions should be met.

The lime or limestone should be of high purity, that is, having less than 0.1% and preferably less than 0.01% color degrading impurities, should be wet or dry ground to a size less than 200 mesh but preferably with a majority of the particles less than 10 microns and made up as an aqueous slurry containing from 20% to 60% solids. The waste sulfuric acid which is admixed with the lime or limestone slurry to convert the latter to gypsum should be below 400 grams per liter sulfuric acid in order to avoid the uncontrolled formation of anhydrite during reaction of the acid with the lime or limestone. Waste acids in general will vary from 10 grams per liter up to 400 grams per liter but are rarely higher than 400 grams per liter. Waste acids used may be the spent pickle liquors obtained in the pickling of iron, but a particularly satisfactory waste acid is the mother liquor produced from the hydrolysis of titanium sulfate liquor in the manufacture of titanium dioxide pigment by digestion of titaniferous ores in $H_2SO_4$. The strength of these waste acids will be between about 30 and 300 grams per liter.

In preparing the gypsum, the lime or limestone slurry is reacted with the waste acid with agitation at a temperature from 20° C. to 80° C. Temperatures above 80° C. are undesirable since the gypsum tends to convert to a coarse anhydrite which is unsatisfactory as seed material.

The amount of waste acid relative to the amount of lime or limestone employed in the preparation of the gypsum has a significant effect on its purity for it has been found that when neutralization of the waste acid by the lime or limestone goes beyond about pH of 5.0, metal impurities in the waste acid, such as iron, vanadium, chromium and manganese, tend to precipitate out of solution thus contaminating the precipitated gypsum. It is important, therefore, that the amount of waste acid used be sufficiently in excess of the lime or limestone so that the final acid concentration is at least 1 gram per liter. The conversion of the lime or limestone to gypsum is substantially instantaneous and complete upon the conclusion of the mixing of the waste acid with the lime or limestone after which the gypsum is deliquored and washed. The latter step, that is, the washing may not be necessary where the waste acid is very low in impurities. The washed gypsum has an average particle size of less than 10 microns and should contain less than 0.1% preferably less than 0.01% color degrading impurities.

In order to prepare pigmentary grade anhydrite by the use of gypsum according to the process of this invention, the washed gypsum either as naturally occurring gypsum or prepared from lime or limestone as hereinabove described, is mixed with water to form a predetermined amount of slurry having from 20% to 50% solids. A minor portion, i.e. at least 5% and less than 50% of the total predetermined amount of gypsum is then added with rapid agitation to sulfuric acid, having a concentration of from 74% to 80%, the temperature at the start of the reaction being from 20° C. to 60° C. and the rate of addition of the gypsum slurry to the sulfuric acid being from 0.0125 to 1.0 part per minute gypsum, calculated as $CaSO_4$, for each part of $H_2SO_4$, calculated as 60° Baumé acid. Acid concentrations above 80% or below 74% are unsatisfactory since the particle size of the anhydrite tends to be so large as to be unsuitable for the production of composite-titanium dioxide pigments. The time required to add the gypsum slurry to the virgin sulfuric acid to form the seed may vary from 4 minutes to 60 minutes during which time the temperature of the reaction may rise to as high as 80° C. If the gypsum slurry is added at a rate either above or below the range cited above, the seed formed will be too coarse. The final acid concentration of the slurry at the end of the anhydrite seed preparation should vary from 10 to 50%.

After the anhydrite seed has been formed, the remainder or major portion of the gypsum slurry is added with agitation to the anhydrite seed preparation and the mixture is heated preferably by the admission of steam to maintain a temperature from 80° C. to boiling to convert all of the gypsum to anhydrite. The anhydrite formed by the process of the instant invention is of pigment grade quality and, therefore, excellently suited for the manufacture of titanium dioxide-calcium sulfate composite pigments by the well-known co-precipitation method. The anhydrite produced has exceptionally high purity and an average particle size from 0.4 micron to 0.8 micron as determined by the air permeation method.

As has been pointed out above the invention is not limited to the use of a gypsum prepared by reacting lime or limestone with waste acid but may be carried out equally effectively using naturally occurring gypsum which like that prepared by reacting waste acid with lime or limestone is a non-alkaline reacting calcium compound.

It has also been found that in preparing gypsum for anhydrite manufacture by the use of waste acid and in particular a waste acid which has been recovered from the hydrolysis of a sulfate solution of titanium dioxide certain additional controls must be exercised should the waste acid contain more than about 0.1 gram per liter suspended titania hydrate.

Numerous tests have shown that an anhydrite produced from waste acids containing more than 0.1 gram per liter suspended titania hydrate expressed as $TiO_2$ and used in the production of composite calcium sulfate $TiO_2$ pigments has an adverse effect upon both the color and tinting strength of the composite pigment. In the event, therefore, that the suspended titania hydrate in the waste sulfuric acid is greater than 0.1 gram per liter, expressed as $TiO_2$, it has been found expedient to permit the anhydrite seed preparation to cure at least 30 minutes before the remainder of the gypsum slurry is added. By curing the seed suspension, for at least 30 minutes but not over 2 hours, the effect of the suspended titania hydrate in the waste acid is rendered less harmful. Should the suspended titania hydrate in the waste sulfuric acid liquor be higher than 0.1 gram per liter as for example as high as 2 grams per liter expressed as $TiO_2$, it is desirable to effect a higher acid concentration at the end of the seed preparation, i.e., an acid concentration between 25% and 50%.

In order to more fully illustrate the process of the instant invention, the following examples are presented.

*Example 1*

30,000 pounds of limestone ground to −200 mesh and containing 0.008% color degrading impurities were mixed with 45,000 pounds of water to make a slurry containing 40% solids. This slurry was then added continuously at a temperature of 30° C. and at the rate of 225 lbs./min. to a tank into which waste sulfuric acid at a temperature of 50° C. and containing 6% $H_2SO_4$ and 6% $FeSO_4$ was also added at a rate of 2250 lbs./min. to form gypsum. The temperature of the reacted mixture in the tank was 60° C. The resulting gypsum slurry containing 15 grams per liter $H_2SO_4$ was passed over a rotary vacuum-type filter and deliquored and washed with water. The washed gypsum cake weighed 103,200 pounds and contained 50% solids.

This cake was then diluted with 11,800 pounds of water to form a gypsum slurry containing 45% solids and having a pH of 6.0, the average particle size of the gypsum in the slurry being 2.5 microns.

23,000 pounds of the washed gypsum slurry were added with rapid agitation to 7500 pounds of 78% $H_2SO_4$ at the rate of 1000 pounds per minute to form the anhydrite seed. The temperature of the gypsum slurry was 35° C. while the temperature of the 78% $H_2SO_4$ was 40° C. Upon the addition of the gypsum slurry the temperature of the mixture rose to 55° C. in 5 minutes and remained at 55° C. until the end of the strike period. This anhydrite seed slurry was then transferred to a larger tank containing a sweep-agitator and to the seed slurry in the larger tank was added the remainder of the gypsum slurry, i.e., 92,000 lbs. over a period of 92 minutes.

The mixture was heated to 100° C. with steam during the addition of the remainder of the gypsum slurry to convert all of the gypsum to anhydrite. The amount of acid remaining in the liquor in the anhydrite slurry was 7%.

The resultant anhydrite had an average particle size of 0.58 micron and contained less than 1% gypsum.

This slurry was then used for the production of coalesced calcium sulfate-titanium dioxide pigment possessing an excellent color and high hiding power.

*Example 2*

1,000 grams of hydrated lime slurry containing 37.6% solids were mixed with 29,500 grams of waste acid containing 6% $H_2SO_4$ and 6% $FeSO_4$. The gypsum formed was then filtered and washed to remove acid soluble impurities and 2330 grams of gypsum were obtained. This washed gypsum was then made into a slurry containing 40% solids and weighed 5825 grams. This gypsum slurry had a pH of 6.5 and the average particle size of the gypsum in the slurry was 1.8 microns.

874 grams of the washed gypsum slurry at a temperature of 35° C. were added at the rate of 97 grams/min. with rapid agitation to 332 grams of 78% $H_2SO_4$ at a temperature of 40° C. to form the anhydrite seed. Upon the addition of the gypsum slurry the temperature of the mixture rose to 53° C. in 3 minutes and remained at 53° C. until the end of the addition period. To this anhydritie seed slurry was then added the remainder of the gypsum slurry, i.e., 4951 grams over a period of 50 minutes.

The mixture was heated to 100° C. with steam during the addition of the remainder of the gypsum slurry to convert all of the gypsum to anhydrite. The amount of acid remaining in the liquor in the anhydrite slurry was 6%.

The resultant anhydrite formed had an average particle size of 0.65 micron and contained less than 1% gypsum.

This slurry was then used for the production of coalesced calcium sulfate-titanium dioxide pigment possessing an excellent color and high hiding power.

*Example 3*

Example 1 was repeated except the waste acid employed contained 1 gram per liter of suspended titania hydrate expressed as $TiO_2$. As described in Example 1 the gypsum slurry was formed by reacting limestone with waste acid and the anhydrite seed slurry was formed in the same manner except that it was held at 55° C. for one hour with rapid agitation after the seed was formed. The remainder of the gypsum slurry was then added to the seed preparation as described in Example 1 and substantially identical results were obtained.

*Example 4*

Natural gypsum which contained 0.008% color degrading impurities was ground to —200 mesh and made up into an aqueous slurry by mixing 516 grams of natural gypsum with 774 grams of water. This gypsum slurry was processed according to the procedure described in Example 2. The final anhydrite produced had an average particle size of 0.7 micron and was substantially identical to the anhydrite produced in the previous examples with respect to its pigmentary properties.

From the above description and by the examples presented it has clearly been shown that a pigmentary grade of anhydrite may be made from lime or limestone by reacting the latter with $H_2SO_4$ of low acid concentration; and that the gypsum prepared in this manner, or naturally occurring gypsum may be converted to anhydrite by treatment with $H_2SO_4$ in a manner characterized by a preliminary seeding step. The process employed is economical and simple to operate and the anhydrite produced possesses the necessary properties, as to particle size and purity, to be useful for the manufacture of calcium sulfate-titanium dioxide composite pigments. Anhydrite made by this process has a particle size considerably less than 1 micron and is substantially free from color degrading impurities.

While this invention has been described and illustrated by the examples shown, it is not intended to be strictly limited thereto and other modifications and variations may be employed within the scope of the following claims.

We claim:

1. A method for the preparation of a pigmentary grade anhydrite which comprises: preparing an anhydrite seed by adding a minor portion of a predetermined amount of gypsum with rapid agitation to sulfuric acid at a temperature from 20° C. to 70° C. and having an acid concentration from 74% to 80%, said gypsum being added to said $H_2SO_4$ at the rate of from 0.0125 to 1.0 part calculated as $CaSO_4$ for each part $H_2SO_4$ calculated as 60° Baumé acid per minute, and maintaining the reaction temperature from 20° C. to 80° C., adding the remaining portion of the gypsum to said anhydrite seed, and heating the mixture to a temperature from 80° C. to boiling to convert all of the remaining gypsum to anhydrite.

2. A method for the preparation of finely divided pigmentary anhydrite which comprises forming a gypsum slurry having from 20% to 50% solids, the gypsum in said gypsum slurry having no more than 0.1% color degrading impurities and having a particle size which passes through a 200 mesh screen, adding with rapid agitation a minor portion of the gypsum slurry to sulfuric acid of concentration from 74% to 80% to form a seed, the temperature of the acid being from 20° C. to 70° C., the minor portion of the gypsum slurry used for preparation of the seed being at least 5% and less than 50% of the total amount of gypsum slurry, the amount of gypsum added to the sulfuric acid being from 0.0125 to 1.0 part, calculated as $CaSO_4$, for each part of $H_2SO_4$, calculated as 60° Baumé acid per minute, the reaction temperature being from 20° C. to 80° C., the time of addition to form the seed being from 4 minutes to 60 minutes, the final acid concentration at the end of the seed preparation being from 10% to 50%, adding the remainder of the gypsum slurry to the seed preparation and heating with agitation at a temperature from 80° C. to boiling during the addition of the remainder of the gypsum slurry to convert all of the gypsum to anhydrite.

3. A method for the preparation of anhydrite which comprises admixing a calcium compound selected from the group consisting of lime and limestone with waste sulfuric acid to form gypsum in a slurry having a final acid concentration of from 1 gram per liter to 100 grams per liter said calcium compound being of size to pass through a 200 mesh screen, said calcium compound containing no more than 0.1% color degrading impurities, washing said gypsum and forming a gypsum slurry containing from 20% to 50% solids, adding with rapid agitation a minor portion of the gypsum slurry to sulfuric acid of concentration from 74% to 80% to form a seed, the minor portion of the gypsum slurry used for preparation of the seed being at least 5% and less than 50% of the total amount of gypsum slurry, the amount of gypsum added to the sulfuric acid being from 0.0125 to 1.0 part, calculated as $CaSO_4$, for each part of $H_2SO_4$, calculated as 60° Baumé acid per minute the reaction temperature being from 20° C. to 80° C., the time of addition to form the seed being from 4 minutes to 60 minutes, the final acid concentration at the end of the seed preparation being from 10% to 50%, adding the remainder of the gypsum slurry to the seed preparation and heating at a temperature from 80° C. to boiling during the addition of the remainder of the gypsum slurry to convert all of the gypsum to anhydrite.

4. A method for the preparation of anhydrite which comprises admixing a calcium compound selected from the group consisting of lime and limestone with waste sulfuric acid to form gypsum in a slurry having a final acid concentration of 1 gram per liter to 100 grams per liter $H_2SO_4$, said waste sulfuric acid having from 0.1 gram per liter to 2.0 grams per liter suspended $TiO_2$, washing the gypsum and forming a slurry containing from 20% to 50% solids, adding with rapid agitation a minor portion of the gypsum slurry to sulfuric acid of concentration from 74% to 80% to form a seed, the minor portion of the gypsum slurry used for preparation of the seed being at least 5% and less than 50% of the total amount of the gypsum slurry, the amount of gypsum added to the sulfuric acid being from 0.0125 to 1.0 part, calculated as $CaCO_4$, for each part of $H_2SO_4$, calculated as 60° Baumé acid per minute, the reaction temperature being from 20° C. to 80° C. the time of addition to form the seed being from 4 minutes to 60 minutes, the final acid concentration at the end of the seed preparation being from 25% to 50%, and after forming the seed, holding said seed for a period of at least 30 minutes, then adding the remainder of the gypsum slurry to the seed preparation and heating at a temperature from 80° C. to boiling during the addition of the remainder of the gypsum slurry to convert all of the gypsum to anhydrite.

References Cited in the file of this patent
UNITED STATES PATENTS 2,006,342     Booge et al. _____ July 2, 1935
2,021,910     Crundell _____ Nov. 26, 1935